United States Patent [19]
Bauer

[11] 3,895,084
[45] July 15, 1975

[54] FIBER REINFORCED COMPOSITE PRODUCT

[75] Inventor: Dieter W. Bauer, Whittier, Calif.

[73] Assignee: Ducommun Incorporated, Los Angeles, Calif.

[22] Filed: Mar. 28, 1972

[21] Appl. No.: 238,813

[52] U.S. Cl. .................... 264/29; 161/47; 161/170; 264/60; 264/81; 264/162; 264/296; 264/DIG. 19
[51] Int. Cl.. C01b 31/02; C01b 31/07; C01b 31/30
[58] Field of Search .......... 264/29, 60, 81, 296, 82, 264/DIG. 19, 162; 161/47, 60, 170

[56] References Cited
UNITED STATES PATENTS

| | | | |
|---|---|---|---|
| 3,233,014 | 2/1966 | Bickerdike et al. | 264/29 |
| 3,238,054 | 3/1966 | Bickerdike et al. | 264/29 |
| 3,369,920 | 2/1968 | Bourdeau et al. | 264/29 |
| 3,552,533 | 1/1971 | Nitz et al. | 264/DIG. 19 |
| 3,580,731 | 5/1971 | Milewski et al. | 264/DIG. 19 |
| 3,629,049 | 12/1971 | Olcott | 264/DIG. 19 |
| 3,639,197 | 2/1972 | Spain | 264/DIG. 19 |
| 3,657,061 | 4/1972 | Carlson et al. | 264/DIG. 19 |
| 3,700,535 | 10/1972 | McCoy et al. | 264/DIG. 19 |
| 3,701,704 | 10/1972 | Dervy | 264/DIG. 19 |
| 3,711,361 | 1/1973 | Casadevall | 264/DIG. 19 |

FOREIGN PATENTS OR APPLICATIONS

| | | | |
|---|---|---|---|
| 1,163,979 | 9/1969 | United Kingdom | 264/DIG. 19 |

Primary Examiner—Jeffery R. Thurlow
Attorney, Agent, or Firm—Whann & McManigal

[57] ABSTRACT

A fiber reinforced composite product and method of producing the product in which yieldable, high strength carbon or graphite fibrous materials are formed into a substrate that has been optimized for final product application through the accurate control of its shape, cross-sectional configuration, density, fiber volume and internal fiber orientation. While constrained to the desired configuration, the optimized substrate is infiltrated with a pyrolytic material in a manner as to structurally bond together the fibrous materials which make up the substrate. The article thus formed is then densified in a controlled manner by further infiltration with pyrolytic material to the degree necessary to achieve the desired final product density.

15 Claims, 6 Drawing Figures

3,895,084

FIBER REINFORCED COMPOSITE PRODUCT

BACKGROUND OF THE INVENTION

1. Field of the Invention

This invention relates generally to carbon and graphite composite articles and more particularly to high strength fiber reinforced carbon and graphite composite articles and the method for producing such articles.

2. Description of the Prior Art

With the rapid advance of aircraft, nuclear and aerospace and high temperature technologies there is an ever increasing need for new types of high strength composition materials that are capable of reliably withstanding high temperatures and pressures. Additionally, new methods are required to expeditiously fabricate these materials into articles having a wide variety of complex and intricate shapes. Examples of such articles include thin wall leading edges, radiation shields, aircraft brakes, nozzle inserts and nose tips as well as various types of structures having thin wall webs.

Numerous types of carbon and graphite composite articles and the methods for producing such articles have been described in the prior art. Although many of these methods and products have significantly contributed to the support of the advancing technologies, they have not been entirely suitable in applications where final part densities and physical dimensions must be controlled to very close tolerances, and where high strength articles having superior friction and wear characteristics are required. Applicant is familiar with the following prior art disclosures which illustrate the inadequency of the prior art for accurate control of product shape, cross-sectional configuration, density, fiber volume and internal fiber orientation.

| Patentee | Patent No. | Issue Date |
| --- | --- | --- |
| Dosker | 2,653,890 | Sept. 29, 1953 |
| Labino | 2,658,848 | Nov. 10, 1953 |
| Rusch, Rumson | 2,743,207 | Apr. 24, 1956 |
| Labino | 3,053,715 | Sept. 11, 1962 |
| Gibson, et al. | 3,174,895 | Mar. 23, 1965 |
| Bickerdike, et al. | 3,233,014 | Feb. 1, 1966 |
| Bickerdike, et al. | 3,238,054 | Mar. 1, 1966 |
| Hough | 3,462,340 | Aug. 19, 1969 |
| Watts | 3,367,812 | Feb. 6, 1968 |
| Bourdeau, et al. | 3,369,920 | Feb. 20, 1968 |
| Wainer, et al. | 3,374,102 | Mar. 19 1968 |
| Beasley | 3,407,038 | Oct. 22, 1968 |
| Rohl, et al. | 3,462,289 | Aug. 19, 1969 |
| Olstowski, et al. | 3,502,759 | Mar. 24, 1970 |
| Williams, et al. (Br.) | 1,163,979 | Mar. 7, 1967 |

The only patents of those enumerated which are considered to be even remotely pertinent to the invention as disclosed herein are the patents to Bickerdike, U.S. Pat. Nos. 3,233,014 and 3,238,054, the patent to Bourdeau, et al. U.S. Pat. No. 3,369,920 and the British patent to Williams, et al. The only similarity between the inventions described in these patents and my invention, however, resides in the fact that similar furnace processing conditions can be used for coating carbon or graphite fibers with pyrolytic materials. The patens neither describe nor suggest the novel and important substrate optimization techniques described herein, and clearly cannot be combined to suggest to one skilled in the art, applicant's novel techniques for accurate control of product shape, cross-sectional configuration, density, fiber volume and internal fiber orientation.

The Bickerdike patents describe the formation of a substrate of organic wool or fabric which is first treated with a resin and then carbonized. After carbonization, the substrate is infiltrated with pyrolytic carbon by subjecting it to elevated temperatures in a benzene/nitrogen atmosphere.

The method of my invention as described and claimed herein is uniquely different from Bickerdike in that I do not use organic fibers in the form of wool or cloth prior to the infiltration step. Rather, I use either a graphite or carbon fiber which can be a high strength, high modulus fiber in the form of cloth, yarn, tow or three-dimensionally woven panels. Most importantly, my invention does not involve a carbonization step, and thereby avoids the problems of spontaneous substrate shrinkage and distortion which are inherent in the carbonization step. Also avoided is material property variation due to carbonization, such as low or high shrinkage areas due to variations in the precursor.

Because the carbonization step is not necessary in the method of my invention and due to the novel and unique way in which I optimize the substrate for final product application prior to infiltration, my invention permits the controlled fabrication of a wide range of intricate and complex high strength composite articles specifically tailored for given end product uses.

The British Patent to Williams, et al. is specifically directed towards various furnace processing techniques for the coating of fibrous materials and for the densification of fibrous substrate through the controlled deposition of pyrolytic materials. While the final step of my process also involves substrate densification, it is important to note that an important feature of my process relates to the novel way in which the basic substrate is optimized for densification. Additionally, where Williams relies solely on furnace processing techniques to control final part densities, in my invention substrate optimization provides the basic means for final part density control with furnace processing techniques serving as a supplementary fine control over final article density.

DEFINITION OF TERMS a. Carbon fibers are fibers produced by the heat treating of both natural and synthetic fibers of materials such as, for example, wool, rayon, polyacrolynitrile and pitch at temperatures on the order of 1000°C.

b. Graphite fibers are fibers produced by the heat treating of carbon filters at graphitizing temperatures on the order of 2000°C. or more.

c. Pyrolytic carbon, as the term is used herein, refers to the carbon material which is deposited on a substrate by the thermal pyrolysis of a carbon bearing vapor.

d. Pyrolytic graphite is a trade name which has been given to carbon deposited from a hydrocarbon gas over the temperature range of 1750° to 2250°C. It is a specific high temperature form of pyrolytic carbon.

e. Pyrolytic carbon infiltration is a term used to describe the carbon densification processing of porous fiberous and particulate substrates.

SUMMARY OF THE INVENTION

My invention relates to high strength fiber reinforced carbon or graphite composite articles which are produced by accurately forming a substrate from a yieldable carbon or graphite fibrous material, constraining the substrate to its formed configuration while infiltrating it with a pyrolytic material in a manner as to initially bond together the fibrous material of the substrate, and subsequently further infiltrating the bonded substrate with pyrolytic material in order to controllably achieve the desired final part density.

It is an object of my invention to provide a method of making a high strength, high temperature fiber reinforced composite product in which materials in the form of carbon or graphite cloth, tape or other woven and non-woven structures are first assembled together to form a substrate which is optimized for final product use by carefully controlling its shape, fiber density, fiber volume and internal fiber orientation. The substrate, while accurately constrained to its formed configuration, is then infiltrated with a pyrolytic material in a manner so as to securely bond together the fibrous material which makes up the substrate. The bonded substrate can then be densified to the degree desired by further controlled interstitial deposition of a pyrolytic material.

It is another object of my invention to provide a method as described in the previous paragraph in which a wide variety of high strength, high modulus graphite or carbon woven and non-woven materials can be used to produce intricately-shaped articles for high-temperature, high pressure application wherein such articles have a predetermined fiber volume and configuration, and exhibit superior friction and wear characteristics.

It is a further object of my invention to provide a method of the class described in which fiber reinforced articles can be constructed in a variety of shapes and sizes through the systematic and controlled assembly and forming of a plurality of layers of carbon or graphite woven and non-woven material, the contiguous fibers of which are then bonded together by a coating of a pyrolytic material.

It is another object of my invention to provide a method of making fiber reinforced composite products in which final product density is accurately controlled by optimizing the fiber structure and fiber volume of the substrate, and also by the controlled interstitial deposition of a pyrolytic material into the formed substrate.

It is still another object of my invention to provide high strength fiber reinforced articles which are composed of a carbon or graphite fibrous material bonded together by a pyrolytic material and which are made up of a plurality of contiguous layers of fibrous material, the planar orientation of which has been optimized for end product use.

It is another object of my invention to provide a high strength fiber reinforced article for use in aircraft braking systems which is made up of a plurality of iris petal-shaped segments of carbon or graphite fabric material which have been systematically assembled in a shingle-like fashion so as to create the maximum practical edge grain exposure and which have been bonded together by interstitially deposited pyrolytic carbon or other suitable pyrolytic material.

It is another object of my invention to provide a high strength fiber reinforced article which is made up of a plurality of layers of a carbon woven material wound circumferentially about the longitudinal axis of the article.

It is a further object of my invention to provide a high strength fiber reinforced article composed of a yieldable carbon fibrous material bonded together with a pyrolytic material selected from a group consisting of pyrolytic carbon, pyrolytic graphite, silicon nitride, boron nitride, titanium tantalum, tungsten, molybdenum, columbium, tantalum carbide, niobium carbide, zirconium carbide, hafnium carbide, tungsten carbide, titanium carbide and silicon carbide.

It is still another object of my invention to provide a method of forming a product of the class described which is made up of a carbon fibrous woven material including abrading the surfaces of the material so as to form numerous nucleation sites for the deposition of pyrolytic material and thereby achieve better bonding of the fibrous material.

It is another object of my invention to provide a method of forming a product of the type described in the previous paragraphs in which the basic substrate is formed into the desired shape by means of a compression fixture which is so constructed and arranged as to allow gases to circulate through the fixture and the shaped substrate.

DESCRIPTION OF THE PREFERRED EMBODIMENTS

In making the composite product of my invention in accordance with the methods of my invention, an optimized substrate having a predetermined shape, cross-sectional configuration and fiber volume is formed from a preselected high strenngth carbon or graphite fibrous material of a given fiber density in the form of a cloth, high modulus tape or other type of fiber structure, and thereafter the substrate is subjected to various process steps including a preliminary bonding step and a subsequent densification step in order to produce the final composite product. Since both carbon and graphite fibrous materials are used in the practice of my invention and in view of the fact that graphite fibrous materials refer to carbon materials heat treated at graphitizing temperatures when the word "carbon" is used hereinafter to describe fibrous substrate materials, it shall be construed to include both carbon and graphite fibrous materials.

FORMING THE SUBSTRATE

The substrates used in the practice of my invention may be formed into a wide variety of complex shapes having various types of cross-sectional configurations and internal fiber orientations, depending upon the specific use which is to be made of the finished article. For example, substrates in the form of generally cylindrically-shaped discs can be constructed by cutting pieces of carbon fiber cloth into circular shapes and then stacking them one upon another in a flat layup configuration. A disc of similar external configuration can be constructed from a plurality of layers of cloth which have been laid upon one another in a shingle-like layup configuration. Alternately, layers of cloth can be laid upon one another in a manner such that the warp direction of the various cloth layers forms a predetermined angle relative to the warp direction in the adjacent layer of cloth. Still another type of disc of different internal configuration can be formed by placing chopped carbon fibers or carbon fiber felt between alternate layers of carbon fiber cloth. Similarly substrates can be formed using only non-woven carbon fibers.

Figure 1:
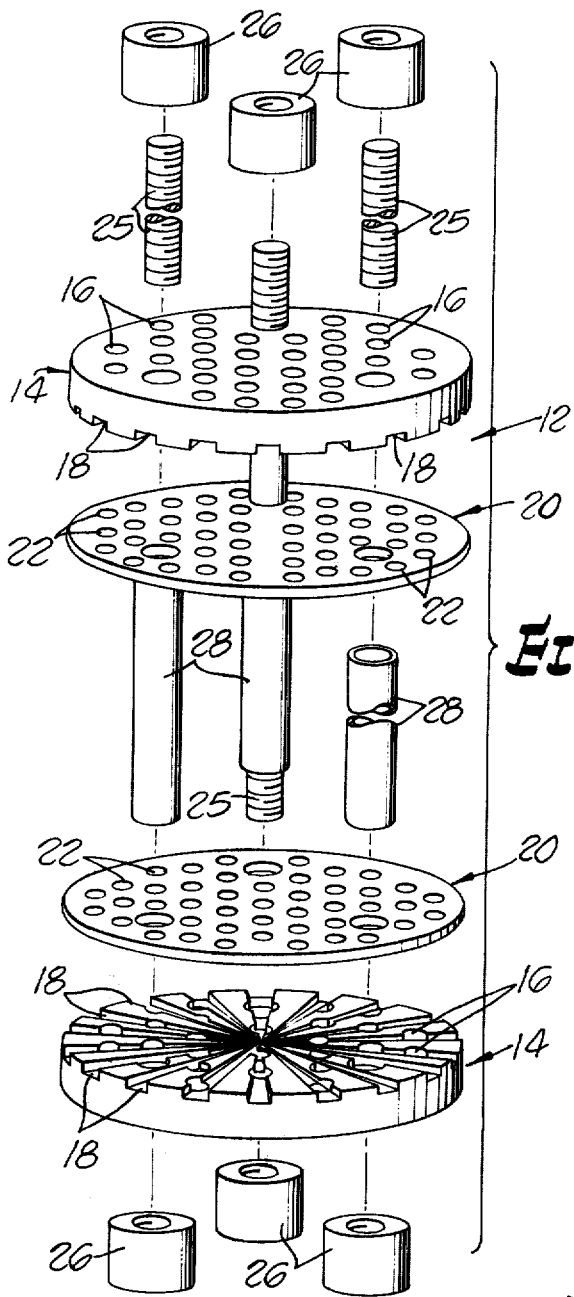
FIG. 1 is an exploded view of a compression fixture of the type used in the practice of the method of my invention to form certain types of basic substrates into shaped substrates.
Figure 2:
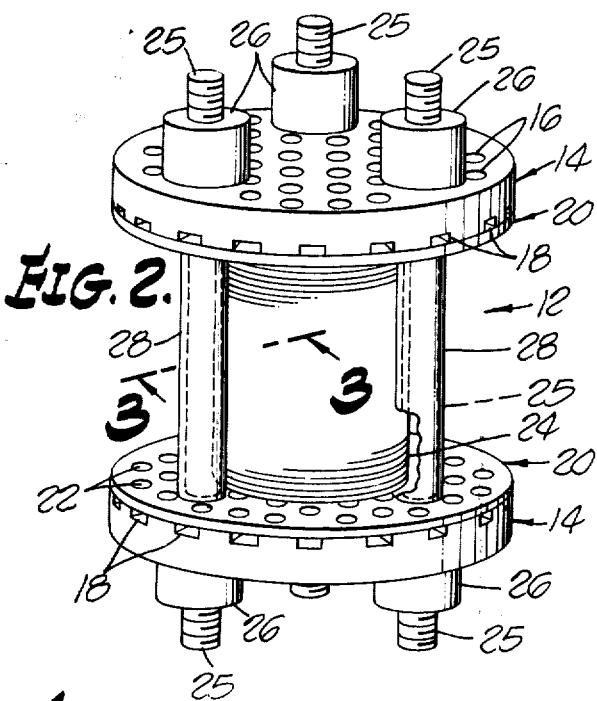
FIG. 2 is a perspective view of a flat layup type of basic substrate in position in the compression fixture.
Figure 3:
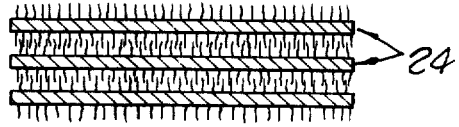
FIG. 3 is a view taken along line 3—3 of FIG. 2 which is magnified to illustrate the way in which the outwardly protruding fibers of the various layers of substrate material interlock to form nucleation sites for subsequently deposited pyrolytic materials.

One form of my invention in which carbon cloth is used in a flat layup configuration to build up the substrate is illustrated in FIGS. 1 – 3. In this form of the invention means for supporting and shaping the starting fibrous material is provided in the form of a compression fixture, generally designated by the numeral 12. The compression fixture which is preferably constructed from a metal, ceramic or refractory material such as graphite comprises a pair of spaced backup plates 14 each having a plurality of aperatures 16 extending therethrough and each having a plurality of radially extending grooves 18 formed in the opposing faces thereof. Supporting means for supporting the graphite cloth of the substrate is provided in the form of a pair of face plates 20 each of which also has a plurality of apertures 22 extending therethrough. The grooves and apertures in the parts of the fixture are arranged to permit circulation of gases through the substrate during the bonding step soon to be described.

In using the compression fixture in the practice of my invention, the lower face plate is first centrally positioned on the lower backup plate, and then specially prepared pieces of carbon or graphite cloth 24 which have been scissor or die cut into a shape which roughly approximates the desired cross-sectional shape of the finished part, as illustrated in FIG. 2, are carefully stacked one on top of the other on the face plate. When sufficient layers of cloth have been assembled together having the required weight to achieve a desired fiber volume and forming a structure having an overall height greater than the desired height of the finished part, the upper face plate is positioned on the topmost cloth layer and the upper backup plate positioned, grooves down, on the face plate. Adjusting means for accurately controlling the distance between the face plates is then adjustably connected to the upper and lower backup plates. The adjusting means is shown in this instance to comprise a plurality of threaded rods 25 which are adapted to protrude through apertures formed in the face plates and backup plates. Nuts 26 are provided at the opposite ends of the threaded rods and are adapted to be tightened against the outer surfaces of the backup plates so as to shorten the distance between the face plates, and thereby controllably compress the cloth layers to the extent desired. Spacers 28 of known length are inserted between the face plates 20 to accurately control the thickness, fiber volume and height of the substrate. This technique embodies the principal means for achieving the desired fiber volume in the substrate.

In constructing the substrate of this form of my invention, numerous types of carbon cloths or woven materials can be used including various types of tight weave and open weave cloths having differing individual fiber strengths and densities. The initial carbon source materials for the carbon cloths or woven material include numerous synthetic and non-synthetic materials, as, for example, wool, rayon, polyacrolynitrile and pitch. The required initial substrate density for a given application is precalculated to achieve the required fiber volume in the substrate. The desired number of cloth layers are then stacked and compacted by adjustment of the compression fixture adjusting means to achieve the precalculated initial substrate density.

I have found that for certain aplications special treatment of the cloth is desirable prior to the building up of the substrate. For example, to provide a greater number of fabric surface bonding sites for subsequent deposition of the pyrolytic material and thereby achieve better bonding between fabric layers and as a result increase the interlaminar shear strength of the substrate, both sides of the cloth can be abraded in a manner which will achieve the highest nap possible without damaging the basic cloth weave. Such surface treatment can be accomplished by brushing the cloth with sandpaper or steel wool, or by abrading the surface by grit blasting.

As illustrated in FIG. 3, during assembly of the surface treated carbon cloth segments, in addition to alternating the direction of the cloth weave from layer to layer, the cloth segments are assembled into the compression fixture so that the side with the highest nap for each cloth layer faces in the same direction. When the cloth is stacked in this manner, the fibers between the cloth layers will intermesh, providing a plurality of nucleation sites for the pyrolytic material which is subsequently deposited during the bonding and densification steps.

In preparing the cloth for assembly into the substrate great care must be taken not to fold, crease, puncture, rip or unravel it. After the cloth has been surface treated and cut into pieces of the desired shape and size, the substrate is built up in the compression fixture in the manner previously described and the layers compressed to the extent necessary to achieve the optimum predetermined fiber volume of the substrate.

An additional feature of my invention lies in the fact that when the cloth layers are compressed by the adjusting means of the compression fixture, cloth from the top layer of the substrate is forced into the apertures in the face plates, forming a dimpled pattern in the cloth which serves to increase the interlaminar shear strength of the substrate upon its subsequent infiltration with pyrolytic carbon.

By using fixtures of different sizes, flat layup substrates of varying heights and diameters can be constructed. I have found, for example, that substratäes having diameters of on the order of 22 inches can be constructed by the method of my invention. Such substrates have proved particularly useful in the production of high strength, thermally stable brake discs for high energy absorption aircraft braking systems. Similarly, flat layup substrates having diameters of on the order of 6 inches and lengths up to 8½ inches have been constructed for use in the production of blast tubes for rocket motor applications. In constructing substrates for similar applications centrally disposed mandrels or connecting rods can be used to form tubular-shaped substrates. For such substrates the cloth or woven material segments are, of course, cut to form a central opening which fits over the central mandrel.

Figure 4:
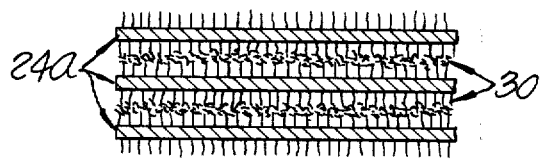
FIG. 4 is a view similar to FIG. 3 but showing another form of substrate in which layers of randomly oriented fibers are interspersed between layers of woven fibrous material.

Another form of my invention, in which carbon cloth is used in conjunction with randomly arranged carbon fibers in the form of felt or chopped fibers, is illustrated in FIG. 4. In this form of the invention a compression fixture 12 of the type previously described is used to support alternate layers of randomly arranged carbon fibers 30 and flat pieces of carbon cloth 24a which can be in untreated form or, alternately, can be pieces of cloth which have been surface treated in the manner described in the previous embodiment. After a substate of the desired length has been constructed, it is compressed to the extent desired by adjusting the adjusting means of the fixture.

Figure 6:
FIG. 6 is a partial cross-sectional view of the substrate shown in FIG. 5 illustrating the orientation of the strips of tape which form the layers of the substrate.
Figure 5:
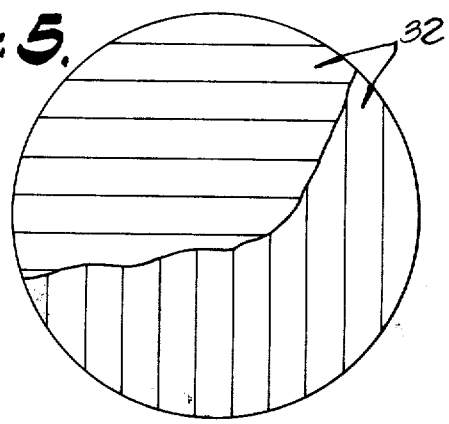
FIG. 5 is a plan view of still another form of substrate in which strips of high modulus fibrous carbon tape material are built up in layers in a fixture of the type shown in FIG. 1 with each layer having the strips of tape turned 90° with respect to the previous layer.

In FIGS. 5 and 6 still another form of the invention is diagrammatically illustrated. In this form of my invention a plurality of thin layers of carbon tape 32 is used to build up the substrate. In constructing the substrate, thin strips of tape are first laid on the lower face plate of a fixture, similar to that previously described, to form a panel having a shape approximating the cross-sectional shape desired of the finished article. Additional layers formed in a similar manner are then added with each layer having the strips of tape turned 90° with respect to the previous layer until a substrate having a length slightly greater than the desired length of the finished part is formed. Other orientations of the strips in adjacent layers may, of course, be used for certain applications. Compression of the substrate to the degree desired can then be accomplished through adjustment of the nuts on the connecting rods of the fixture. A wide variety of high strength, high modulus carbon and graphite tapes is now commercially available. Because these tapes are flexible and easily formable, substrates having complex geometrical shapes can be expeditiously constructed by the method of my invention.

In FIGS. 1 – 6 I have shown, for purposes of more clearly describing the method of my invention, compression fixtures of relatively simple design. An important feature of my invention, however, lies in the fact that my unique process provides a means whereby high strength composite articles can be fabricated in a wide variety of intricate and complex shapes. By way of example, FIGS. 7 and 8 show compression fixtures for use in the fabrication of leading edge and aircraft spoiler shapes.

Figure 7:
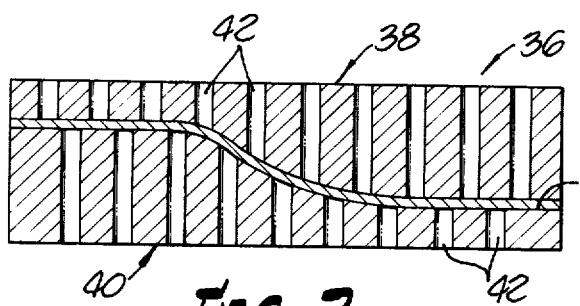
FIG. 7 is a cross-sectional view of another form of substrate of my invention in position within a specially designed fixture for forming the substate.

In FIG. 7 a fixture for forming aircraft spoiler shapes, generally designated by the numeral 36, is shown as comprising upper and lower mating parts 38 and 40, each of which is provided with a plurality of apertures 42 arranged to permit free circulation of gases through the fixture. In constructing an optimized substrate of this form of my invention, fibrous material in the form of cloth, tape or other suitable woven or non-woven fiber structure, which may be either surface treated or not, is systematically arranged on the lower surface 40a of fixture part 40. After sufficient layers of material have been arranged in place on part 40 so as to form the desired basic substrate thickness, upper mating fixture part 38 is positioned on the fibrous material assemblage. The fixture parts may then be clamped together by any suitable means so as to compress the basic substrate to form a shaped substrate having an optimum fiber volume and density.

Figure 8:
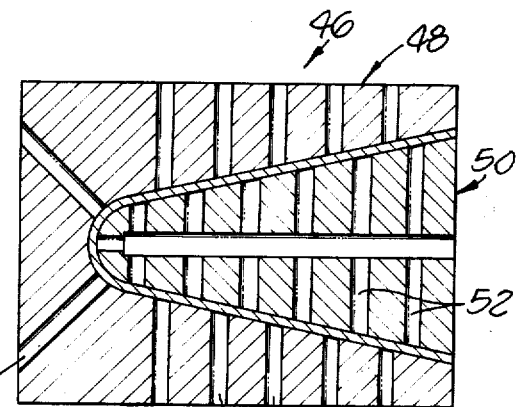
FIG. 8 is a cross-sectional view of still another form of substrate having the shape of a re-entry vehicle leading edge in position within the fixture for forming this type of substrate.

In FIG. 8, a fixture for forming re-entry vehicle leading edges, generally designated by the numeral 46, is shown as comprising first and second mating parts 48 and 50, each of which is provided with a plurality of apertures 52 arranged to permit free circulation of gas through the fixture. An optimized substrate is formed using fixture 46 in generally the same manner as has been previously described. Various types of fibrous materials can be used to form the substrate which is optimized for final product use by controlling substrate weight, volume, fiber arrangement and fiber orientation through systematic assembly of the basic substrate, and then controlled shaping thereof by appropriate adjustment of the mating parts of the compression fixture.

Figure 9:
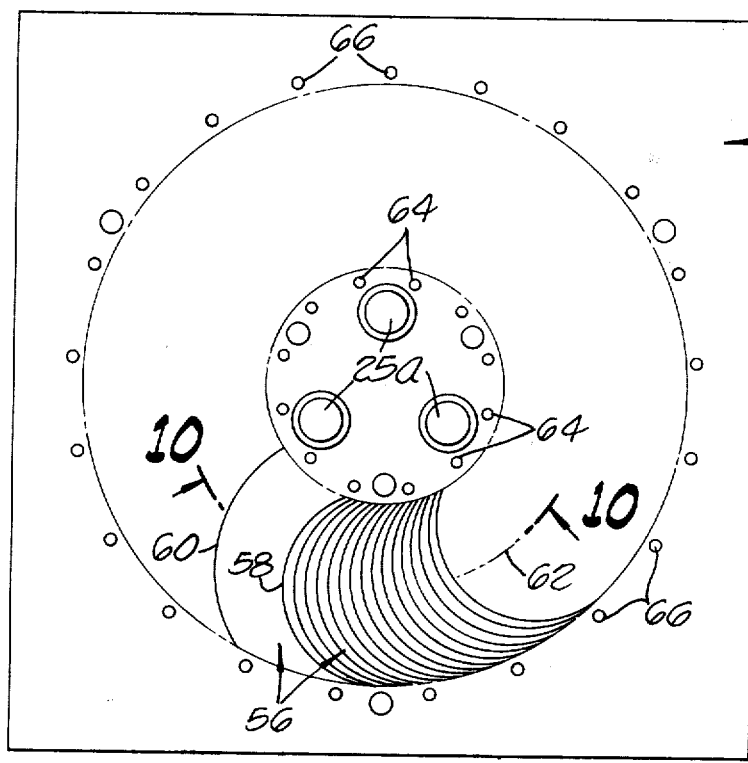
FIG. 9 is a plan view of a partially constructed basic substrate in which specially shaped segments of woven fibrous material are used to construct the substrate.
Figure 10:
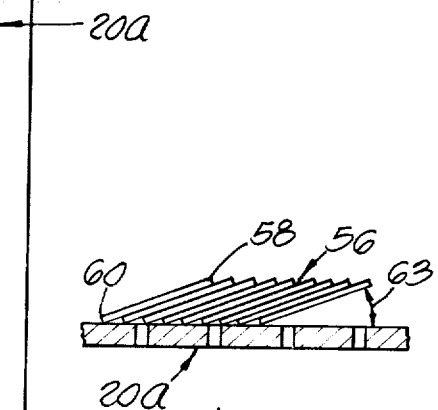
FIG. 10 is a partial cross-sectional view of the substrate taken along line 10—10 of FIG. 9 illustrating the angular orientation of the various layers of material which form the substrate.

Another important and highly useful form of my invention is illustrated in FIGS. 9 and 10. In this form of the invention I also use a carbon cloth or woven material in building up the substrate. In this construction, however, the individual cloth segments 56 are cut into iris petal-shaped pieces, the contour of which is optimized to achieve the maximum edge grain exposure for each cloth segment of the substrate.

In building up the basic substrate, the surface of the cloth is preferably treated in the manner previously described and then the individual segments are either scissor or die cut into the iris leaf-shape illustrated in FIG. 9. Each cloth segment has a leading and trailing edge 58 and 60 in the shape of an involute of a circle. The diameter of the circles used to generate the leading and trailing edge involutes is governed by the diameter of the substrate which is to be formed.

Referring particularly to FIG. 9, it can be seen that in assembling the substrate, the individual cloth segments are laid one upon another in a shingle-like manner on the lower apertured face plate 20a of a compression fixture similar to the fixture shown in FIGS. 1 and 2. By varying the spacing between the leading edges of the segments different angles of inclination 63 of the assembled segments can be achieved. This allows the construction of substrates having a predetermined amount of cloth segment edge grain exposure.

To restrain the segments from moving out of place during substrate assembly, I provide at close intervals around the inside and outside diameter of the substrate a plurality of pins, designated respectively by the numerals 64 and 66. In making a full 360° angled layup, segments are added one upon another around the face plate until the starting point is reached. When the circle has been closed, the initial segments are lifted up, the end segments tucked thereunder and sufficient segments added to make one complete 360° layer of equally spaced segments. Subsequent 360° layers of segments can then be stacked on the assembled substrate, or, if desired, the single layer can be compressed to the degree appropriate in the manner previously described by adding the upper face and backup plates (not shown) and operatively interconnecting the adjusting means made up of threaded rods, and cooperating nuts and spacers (also not shown). Products made from substrates of this form of my invention have excellent friction and wear characteristics, and are particularly useful in high energy absorption aircraft braking systems.

The cross-sectional configuration of the substrate of this form of my invention in which the inclination of the segments is approximately 20° is shown in FIG. 10. I have found that to obtain the maximum practical edge grain fiber effect, the segments must be stacked on top of each other so that the edges of the segments are spaced apart approximately 1/16 inch as measured at the medium diameter 62. By spacing the leading edges of the segments farther apart at the median diameter 62, the angle of inclination of the segments can, of course, be decreased.

It is to be understood that cloth segments having various shapes other than that of an iris petal can be used in this form of my invention. For example, in assembling the substrate a preselected number of individual cloth segments having a generally rectangular, circular, eliptical or free-form shape can be laid one upon the other in a shingle-like manner on the lower face plate 20a and then subsequently compressed in the manner described to form the basic substrate.

Figure 11:
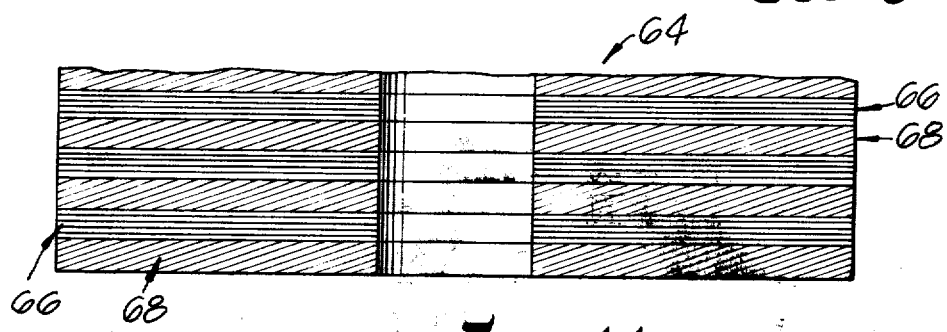
FIG. 11 is a cross-sectional view of another form of substrate of my invention in which bonded substrates assembled from woven material in a flat layup configuration are assembled together with substrates assembled from iris petal-shaped segments as illustrated in FIG. 9 to form the basic substrate. Fixtures of the type shown in FIGS. 1 and 2 are used to form the substrate of this form of my invention.

In FIG. 11 I show yet another form of substrate 64 of my invention in which substrates identified as 66 are used in conjunction with substrates identified as 68, the latter being substrates assembled from iris petal-shaped segments and the former being assembled from woven material in a flat layup configuration. This type of substrate is constructed in a manner previously described using fixtures of the type shown in FIGS. 1 and 2.

Figure 12:
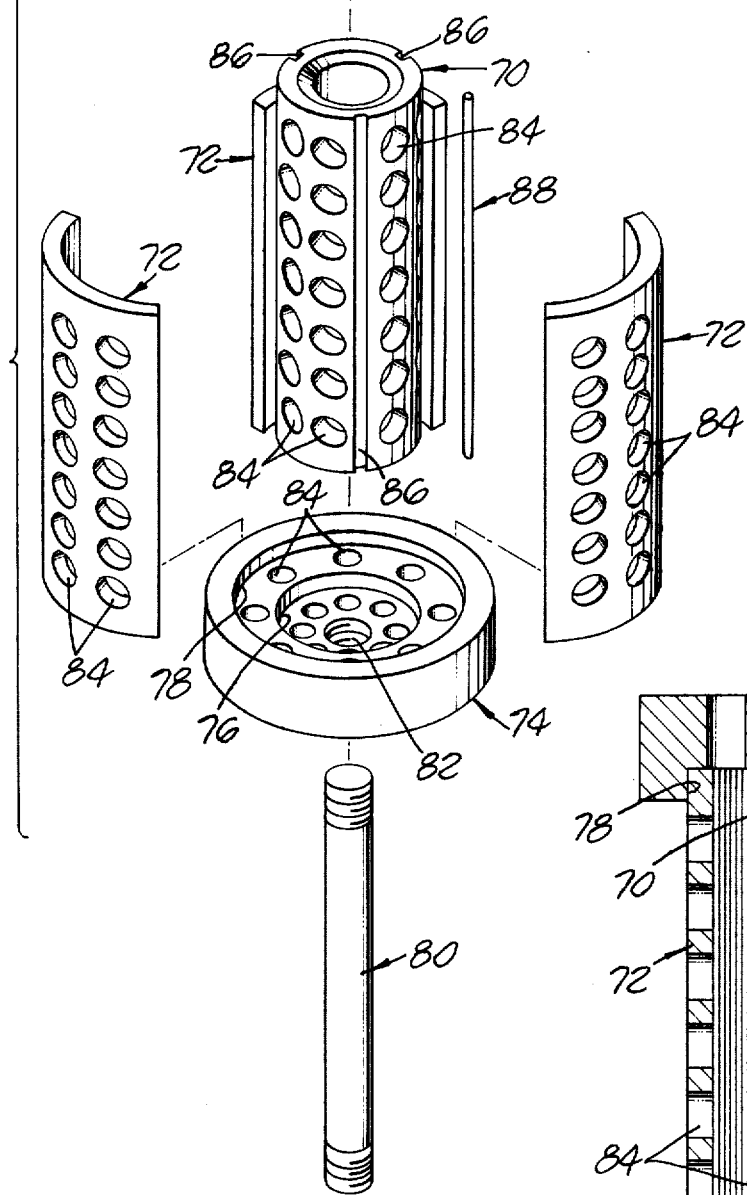
FIG. 12 is an exploded view of a compression fixture of the type used in the practice of the method of my invention to form a circumferentially wound tubular-shaped type of substrate.
Figure 13:
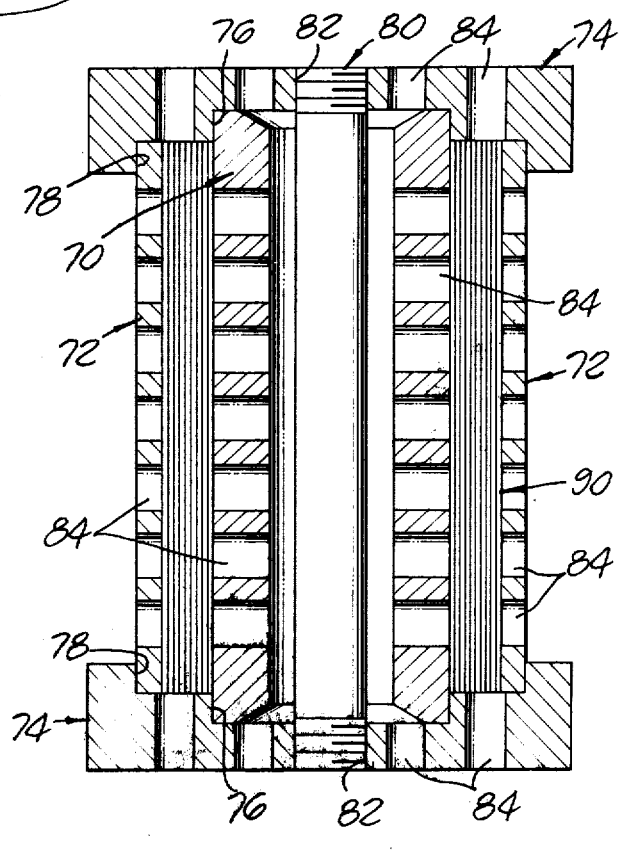
FIG. 13 is a cross-sectional view of the fixture shown in FIG. 12 illustrating the way in which the substrate of this form of my invention is constructed.

Referring to FIGS. 12 and 13, I show another form of my invention in which carbon cloth, tape or other woven or non-woven material is circumferentially wrapped around a specially designed mandrel to form a cylindrically-shaped fiber reinforced composite product having a predetermined fiber weight and volume. In this form of my invention I use an assembly fixture of a type illustrated in FIG. 12. This fixture comprises a hollow, generally cylindrically-shaped inside mandrel 70, a plurality of face plate members 72 constructed in the form of elongated segments of a hollow cylinder whose inside diameter is greater than the outside diameter of inside mandrel 70, a pair of end plates 74 which are provided with counterbores 76 and 78 adapted to receive and support the end portions of the inside mandrel and the face plates and an elongated threaded rod 80 adapted to be threadably received in centrally located threaded apertures 82 provided in end plates 74. The inside mandrel 70, the face plates 72 and the end plates 74 are all provided with a plurality of randomly spaced apertures 84 which are designed to allow the gases to circulate through the fixture.

Equally spaced at 120° intervals around the periphery of inside mandrel 70 are longitudinally extending grooves 86 adapted to closely receive cloth holding pins 88. Grooves 86 along with cooperating pins 88 provide starting points for the winding of carbon cloth or tape onto the mandrel.

In assembling a typical basic substrate after the desired total fiber weight of the final product is determined, three strips of carbon woven material are prepared for assembly. Each strip is cut so as to have a width generally approximating the desired overall height of the final product and a length such that the total weight of the three strips equals the total desired fiber weight required to achieve the fiber volume desired of the final product. The material is preferably surface treated in the manner previously described, and the strips are then secured to inside mandrel 70 by placing one end of each strip over a groove 86 and locking the cloth in place by pressing a cloth holding pin 88 into the groove so as to hold the cloth 90 captive between the bottom of the groove and the holding pin. By rotating mandrel 70 in a lathe or in any other suitable manner, the cloth strips can be wound uniformly onto the mandrel in an overlapping configuration.

After the basic substrate has been assembled in the manner described, face plates 72 are placed in position around the circumferentially wound cloth. In order to form the shaped substrate, a radially inward pressure is exerted on the face plates so as to compress the cloth inwardly against the inside mandrel, and the end plates 74 are then positioned over the ends of the assemblage and secured in place by the adjusting means or threaded rod 80. As shown in FIG. 13, by threading the end plates onto rod 80, the cloth can be axially compressed and in this way the basic substrate formed into a shaped substrate of hollow cylindrical shape having a fixed fiber volume being defined by the cavity formed between the inside mandrel, the face plates and the end plates.

Figure 14:
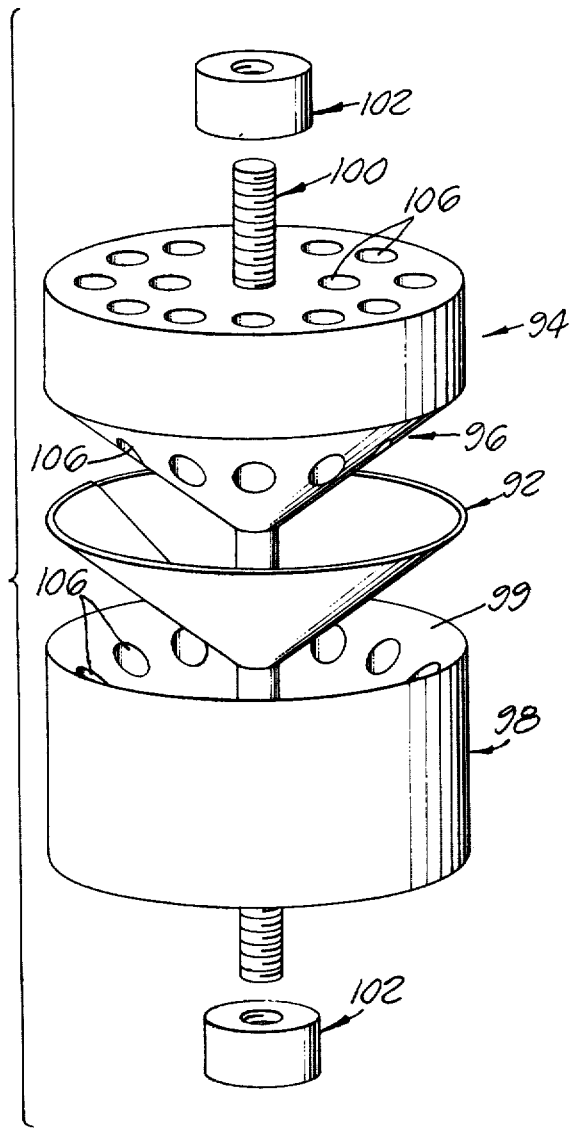
FIG. 14 is an exploded view of another type of fixture used to construct still another form of substrate of my invention.
Figure 15:
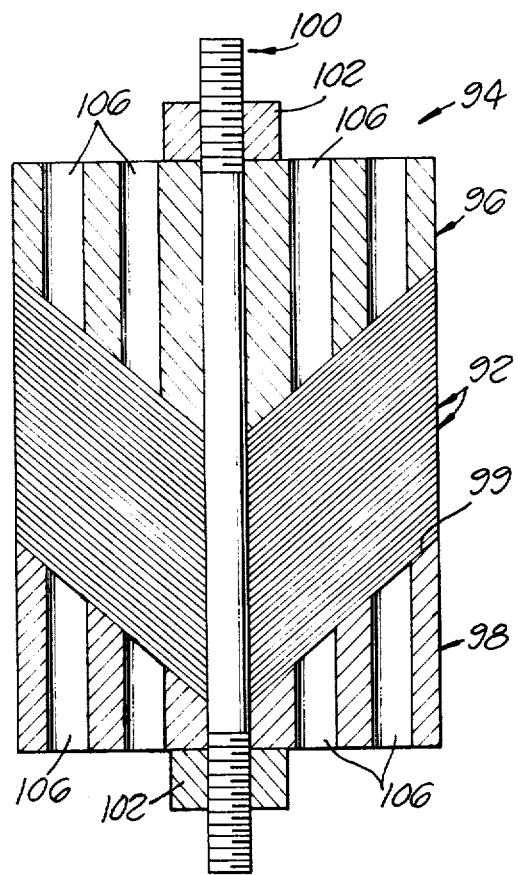
FIG. 15 is a cross-sectional view of the fixture shown in FIG. 14 with a formed substrate in place within the fixture.

In another form of my invention, I use a fixture of the type illustrated in FIGS. 14 and 15 to produce, in accordance with the method of my invention, a composite article formed from a substrate made up of a plurality of cone-shaped carbon cloth members 92 stacked together in a nested fashion. To assemble the substrate of this form of the invention, I use a compression fixture 94 which comprises a conically-shape male face plate 96, a female face plate 98 having a generally cone-shaped cavity 99 adapted to matably receive male face plate 96, and an adjusting means shown here in the form of a threaded rod assembly 100 which axially protrudes through the face plates. Nuts 102 provided at either end of rod 100 can be threaded onto the rods into engagement with the outer surfaces of the face plates, thereby providing means for accurately controlling the spacing between the mating surfaces thereof. Both face plates are provided with a plurality of randomly oriented apertures 106 so as to allow gases to circulate through the fixture.

In constructing the basic substrate of this form of my invention, carbon cloth or woven material which has preferably been surface treated in a manner as previously described is first cut into circularly-shaped segments having a centrally located aperture. Each segment 92 is then shaped into a generally conically-shaped configuration and the various segments coaxially nested together within cavity 99 of female face plate 98. Rod 100 is used as an adjusting means and also serves to axially align the various substrate segments. When an appropriate number of cloth segments has been thus assembled to form a basic substrate having the desired fiber weight, the male face plate 96 is placed over the rod and lowered onto the uppermost cloth segment of the basic substrate. By threading nuts 102 onto rod 100, the shaped substrate can be formed by compressing the basic substrate to the extent desired.

FIG. 15, which is a cross-sectional view of the substrate of this form of my invention as it appears in place in the compression fixture 94, illustrates the angular orientation of the layers of cloth relative to the longitudinal axis of the substrate.

Figure 16:
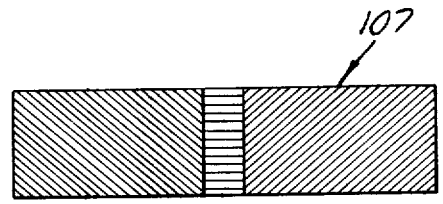
FIG. 16 is a cross-sectional view of a substrate formed from the central portion of a substrate constructed in the manner illustrated in FIG. 15.

After the shaped substrate has been bonded in a manner soon to be described, a disc-shaped member designated as 107 in FIG. 16 can, if desired, be cut from the center part of the substrate. Substrates of this configuration have proved very useful in numerous applications where edge grain exposure is desired.

BONDING THE SHAPED SUBSTRATE

After the shaped substrate has been formed and while it is still held in a shaped configuration in the compression fixture, the fibers of the substrate are provided with a coating of pyrolytic material through known vapor deposition techniques. It is important that during the bonding step each individual fiber of the substrate be provided with a uniform coating. In this way the contiguous fibers of the material used to build up the substrate are eficiently bonded together in a manner as to securely hold the substrate in its shaped configuration.

Various pyrolytic materials may be used in the bonding step including pyrolytic carbon, pyrolytic graphite, certain nitrides such as boron nitride, certain refractory metals such as tantalum, tungsten, molybdenum and columbium, as well as certain carbides including tantalum carbide, niobium carbide, zirconium carbide, hafnium carbide and silicon carbide.

The bonding step may be accomplished in any suitable vacuum deposition furnace having a temperature range of approximately 1470° F to 3350° F. By way of example, the fibrous material which makes up the shaped substrate may be bonded together with a vapor-deposited coating of carbon (pyrolytic carbon). This can be accomplished, for example, by depositing pyrolytic carbon from a carbonaceous gas such as methane ($CH_4$) which dissociates under the influence of heat. This is preferably done in a furnace at a pressure within the range of 1 to 760 mm of mercury (the latter being atmospheric pressure) and usually from about 1 to 50 mm of mercury. The rate of flow of the methane gas may be within a wide range and may include a rate of flow between 5 and 360 cubic feet per hour, depending upon the furnace size. The temperature of the furnace may be in the range of 1470°F. to 2275°F. and preferably is about 1830°F. Infiltration times during the bonding step may vary from 10 to 200 hours, again depending upon the furnace size. Under these conditions active species are formed from methane and penetrate the voids in the fibrous substrates or are formed near the fiber surface and deposit carbon which adheres to the fibers to form a tight mechanical bond. The rate of deposition is a function of the pressure in the furnace, the temperature and the rate of flow of the gases, the gas composition, and the gas residence time. The period of time necessary to effectively bond together the fibrous material of the shaped substrate depends on various factors such as the substrate fiber volume, skeletal composite structure, compositional makeup, pore size, and fiber orientation, as well as on the flow rate of the gas, the deposition temperature and the furnace pressure.

DENSIFYING THE BONDED SUBSTRATE

Following the bonding step, wherein the materials which make up the shaped substrate are bonded together so as to form a bonded substrate having a shape substantially the shape of the final product, the bonded substrate is densified by further infiltration of a pyrolytic material. As in the case of the bonding step, various pyrolytic materials may be used in the densification step.

Although not required, it is preferable to remove the bonded substrate from the compression fixture and accomplish the densification step with the bonded substrate in a freestanding condition. The furnace and the ranges of process parameters used in accomplishing the densification step are generally in the same range as were used in the bonding step. The period of time necessary to achieve the desired density again varies, depending upon the structural characteristics of the substrate and may range from 10 hours to hundreds of hours.

For certain applications where final articles of relatively high density are required, it may be desirable to periodically lightly machine the outside surfaces of the substrate in order to remove materials which have crusted on the outer surfaces. Additionally, where final article densities of on the order of 1.5 g/cc and above are required, it may be necessary periodically to adjust the deposition temperatures, gas flow rates and furnace pressures to insure uniform densification of the substrate which is important to insure final product properties.

EXAMPLE 1

Flat Layup Substrates Using Graphite Cloth

A rayon precursor graphite cloth manufactured by Hitco and identified by the manufacturer as G-1550, eight harness satin (8H/S) was used in this example. Variables affecting infiltration characteristics and mechanical strength of composite articles were studied. For this example five substrates were constructed and infiltrated with pyrolytic carbon. Variations in substrate internal configuration and pore size were accomplished by varying fiber orientation and fiber volume. Fiber volume ranged from 33.6 to 69.3 volume percent (v/o).

At the outset the required cloth (fiber) weight was precalculated in order to achieve the fiber volume desired for each substrate sample (see Table No. 1). Next, both surfaces of the graphite cloth were manually abraded with steel wool to raise the highest nap possible without damaging the cloth. Any steel wool residue remaining after the abrading step was carefully removed, using a strong magnet. Using cutting dies, the cloth was then cut into the desired shape, care being taken not to fold, crease, puncture, rip or unravel it during handling.

After the required number of pieces of graphite cloth had been cut for a given substrate sample construction of the substrate was commenced. Using a compression fixture similar to the one illustrated in FIG. 1 except having a single centrally disposed threaded rod instead of the three rods shown, cloth segments were carefully placed one upon another on the lower face plate. The warp direction in the cloth was used as reference during cutting and layup. The warp direction was alternated to obtain a 0°/90° layup pattern balancing cloth properties in the 0°/90° orientation of the substrate. Care was taken that the side with the highest nap for each cloth layer faced in the same direction. When the cloth is stacked in this manner, the intermeshed fibers between cloth layers provide additional nucleation sites for the pyrolytic carbon, thereby upon infiltration interlocking fiber to fiber and layer to layer, producing a substrate with improved interlaminar shear strength.

After the fuzzed cloth layers had been stacked carefully on the lower face plate, the upper face plate and backup plate were assembled into position and the cloth layers compressed to the degree desired using the center bolt and two nuts. Both face plates had a ¼ inch diameter hole pattern for gas passage. All die sections had been machined from graphite.

With the sample substrates constructed in the manner described and without the addition of any type of reactive materials or impregnates, the infiltration bonding step was commenced using a carbon vapor deposition furnace of the type previously described. Furnace processing conditions were as follows:

Deposition temperature — 1900°F.
Pressure — 70 mm
$CH_4$ flow rate — 8.6 CFH.
Time — 10 hours After the bonding step, the fixtures were disassembled and all loose fibers removed from the substrates with a coarse file.

Finally, the densification step was undertaken wherein each substrate was densified by means of further infiltration in a carbon vapor deposition furnace. Density changes with respect to infiltration time were observed. (See Table No. 2). Furnace processing conditions were as follows:

Deposition temperature — 1900°F.
Pressure — 30 mm ± 3 mm
(For the 120-hour infiltration run for Sample No. 3 a furnace pressure of 40 mm was used.)
$CH_4$ flow rate — 225 CHF.
Time — See Table No. 2

Between infiltration runs the substrates were machined, removing each time approximately 0.065 inches per side from the ID and OD surfaces and 0.032 inches per side from the flat surfaces. All substrates were ultrasonically cleaned in acetone after each machining operation.

After densification the articles were tested to determine edgewise and flatwise flexural strength, interlaminar strength and impact strength. The results of the tests are shown in Table No. 3.

Also tested was a 33.5 v/o material infiltrated to a 1.71 g/cc density. This material had an interlaminar shear strength of 5140 psi, a flexural modulus of 3.31 million psi, and a percent strain to failure of 1.13% (edgewise orientation). When this 1.71 g/cc material was graphitized at 2980°C for two hours, the flexural strength in the edgewise orientation dropped to 16,800 psi and in the flatwise orientation to 13,700 psi. The modulus edgewise and flatwise, respectively, dropped to 2.03 and 1.84 million psi. The percent strain to failure dropped to 0.95% edgewise orientation and 0.84% for the flatwise orientation. The interlaminar shear strength for the graphitized material was measured at 2200 psi with an impact strength of 1.3 ft-lb/in of notch.

EXAMPLE NO. 1

TABLE NO. 1 — SUBSTRATE CHARACTERISTICS

| Sample No. | Dimensions in OD × ID × T | Density as Compressed (g/cc) | Fiber Volume Percent | Cloth Wt. as Compressed (grams) | Number of Layers |
|---|---|---|---|---|---|
| 4 | 3.650 × .750 × .650 | 0.504 | 33.3 | 53.8 | 32 |
| 6 | 3.650 × .750 × .650 | 0.678 | 45.2 | 72.4 | 44 |
| 5 | 3.650 × .750 × .350 | 0.717 | 47.8 | 41.2 | 25 |
| 9 | 3.650 × .875 × .350 | 0.813 | 54.2 | 46.0 | 27 |
| 8 | 3.650 × .875 × .625 | 0.842 | 56.1 | 85.0 | 55 |
| 1 | 3.540 × .750 × .280 | 1.04 | 69.3 | 45.1 | — |

EXAMPLE NO. 1

TABLE NO. 2 — DENSITY CHANGES WITH RESPECT TO INFILTRATION TIME FOR SUBSTRATES

| Sample No. | 4 | 5 | 6 | 8 | 9 | 1 |
|---|---|---|---|---|---|---|
| Density Prior to Infiltration | 0.504 | 0.717 | 0.678 | 0.842 | 0.813 | 1.04 |
| Density After Infiltration for 10 Hours | 0.910 | 1.070 | 1.090 | 1.060 | 1.160 | 1.22 |
| Density After Infiltration for 130 Hours | | | 1.520 | | | 1.49 |
| Density After Infiltration for 160 Hours | 1.630 | 1.590 | | 1.410 | 1.440 | |
| Density After Infiltration for 208 Hours | | | | 1.490 | 1.560 | |
| Density After Infiltration for 280 Hours | | | 1.560 | | | 1.50 |

EXAMPLE NO. 1

TABLE NO. 3 — MECHANICAL PROPERTIES OF INFILTRATED SUBSTRATES

| Sample No. | Final Density g/cc | Flexural Strength (PSI) | | Interlaminar Shear Strength (PSI) | Impact Strength (Ft-lbs/in of Notch) |
|---|---|---|---|---|---|
| | | E | F | | |
| 4 | 1.63 | 24430 | 18670 | — | .950 |
| 5 | 1.64 | 22700 | 17900 | — | — |
| 6 | 1.53 | 22730 | 18970 | 3880 | .763 |
| 8 | 1.49 | 21650 | 18170 | 4090 | 1.011 |
| 9 | 1.56 | 20650 | 19500 | — | — |
| 1 | 1.47 | 24030 | 15130 | — | — |

NOTE:
E = Edgewise Orientation
F = Flatwise Orientation

EXAMPLE 2

Large Diameter Flat Layup Substrates Using Graphite Cloth for High Energy Absorption Aircraft Braking Systems Carbon/carbon composites are of interest as braking material because of their high strength and thermal stability at elevated temperatures and their good coefficient of friction and wear resistance. In this example, as in the previous example, the graphite cloth manufactured by Hitco, G-1550, eight harness satin (8 H/S) was used. The steps followed in this example were generally similar to those described in Example No. 1 except that the samples were much larger. A fixture closely similar to that shown in FIG. 1 was used as the compression fixture.

The following full structural composite brake discs were made to ascertain process scale-up conditions for the manufacture of full size production type parts.

| Disc Identification | Blank Dimensions Prior Infiltration and Final Machined Part Size | |
|---|---|---|
| FS/R | Starting Size: | 16.70" OD × 7.60" ID × 1.00" Thick |
| | Final Size: | 15.70" OD × 8.63" ID × .750" Thick |
| FR-5 | Starting Size: | 17.70" OD × 8.80" ID × 1.00" Thick |
| | Final Size: | 16.70" OD × 9.80" ID × .750" Thick |

The G-1550 graphite cloth for disc FS/R weighed 1423.3 g and for FR-5 1520.0 g. The starting density for each disc when compressed was 0.500 g/cc and 0.501 g/cc, respectively, at a fiber volume of 33.3 v/o and 33/4 v/o, respectively.

The rayon precursor graphite cloth was cut into easy to handle sections; next, both cloth surfaces were abraded (fuzzed) manually by rubbing a fine grade steel wool against the warp and fill yarns raising an even nap. Any steel wool residue was removed with a strong magnet. The disc-shaped cloth layers were cut with a steel rule die. The warp direction in the 8 H/S cloth was used as reference during cutting and layup. The warp direction was alternated to obtain a 0°/90° layup pattern balancing cloth properties in the 0°/90° orientation of the substrate.

Cloth layers were stacked carefully onto face plates of an adjustable graphite compression fixture similar to that shown in FIG. 1. The cloth layers were restrained from moving out of place during compression by three-fourths inch diameter threaded rods located at the OD and ID of the part. Using the adjusting means which comprised graphite bolts and nuts, the parts were next compressed onto 1 inch high spacers to achieve the desired percent fiber volume (nominally 33 v/o). The part thickness was held constant throughout the bonding step by keeping the die platens tightly compressed against the accurately machined spacers.

Both parts were bonded with pyrolytic carbon using processing conditions as previously described.

Upon removal from the fixtures part FS/R had a density of 0.985 g/cc and FR-5 of 1.230 g/cc. After bonding, all loose fibers were manually removed with a coarse file. Between later infiltration runs the discs were machined, removing each time approximately 0.065 inch per side from the ID and OD surfaces and 0.032 inch per side from the flat surfaces.

EXAMPLE 3

Flat Layup Substrates Using Various Types of Carbon Cloth

Four different carbon cloths were investigated as a part of this example to evaluate the effect of cloth type and weave on infiltration characteristics and mechanical properties. The cloths used were: Carborundum Corp. rayon precursor GSCC-8, Eight Harness Satin Weave (8 H/S) carbon cloth and three pitch precursor carbon cloths made by the Kureha Corp., 1 × 1 square weave, 2 × 2 square weave (basket weave type) and an 8 H/S carbon cloth.

Both surfaces of each type of cloth were manually abraded with steel wool, raising the highest nap possible without damage to the basic cloth weave. Any steel wool residue was carefully removed using a strong magnet. The nap fibers pulled out from the woven 2 or 3 ply yarn, were intermingled and matted with the fibers of the adjacent cloth layer when the substrate was compressed.

For substrates using the 8 H/S cloth the warp direction was used as reference during the cutting operation and during the layup of substrates. The warp direction was alternated for the 0°/90° layup balancing cloth properties in the 0°/90° orientation of the substrate.

Square weave carbon cloth was laid up with the weaving pattern running parallel to the cut edge for a rectangular substrate. Similarly, disc-shape layers were laid up with the weaving pattern for each subsequent layer running parallel with the previous one.

Care was taken that the side with the highest nap for each cloth layer faced in the same direction. A compression fixture similar to that shown in FIG. 1 was used and fuzzed cloth layers were stacked carefully on the face plates, compressed, and using appropriate thickness spacers, bolted together and infiltrated.

Using the Carborundum Corp. cloth, 32 layers of cloth identified as GSCC-8, 8 H/S weighing 150.1 were prepared as previously described, and were laid up with a 0°/90° orientation to make a disc 6.125 inches OD × 0.750 inch ID × 0.625 inch thick. Density prior to infiltration, as compressed, was 0.505 g/cc at a fiber volume of 33.7 v/o. Using the standard isothermal infiltration process, the substrate was bonded reaching a density of 1.378 g/cc.

After the bonding step and removal from the fixture, all loose fibers were manually removed with a coarse file. The substrate was then infiltrated in a manner as previously described. Substrate bulk density was 1.49 g/cc. Higher densities were achieved with additional infiltration.

Mechanical property data for specimens with a density of 1.55 g/cc is as follows:

| FLEXURAL STRENGTH PSI | | INTERLAMINAR SHEAR STRENGTH PSI | IMPACT STRENGTH FT-LBS/IN OF NOTCH |
|---|---|---|---|
| E | F | | |
| 14830 | 8700 | 1370 | 1.02 |

E = Edgewise Orientation
F = Flatwise Orientation

Using the Kureha Corp. cloth, 23 layers of surface roughened Kureha 1 × 1 square weave carbon cloth weighing 49.5 g were prepared as previously described and were laid up to make a disc 3.625 inches OD × 0.875 inch ID × 0.625 inch thick. The cloth was compressed between the two face plates using one center bolt and two nuts. Both face plates had a ¼ inch diameter hole pattern for gas passage. When compressed, the substrate had a density of 0.50 g/cc at a fiber volume of 31%.

After bonding the fixture was disassembled and all loose fibers removed from the substrate with a coarse file. Between later infiltration runs the disc was machined, removing each time approximately 0.065 inch per side from the ID and OD surfaces and 0.032 inch per side from the flat surfaces.

Substrate density changes with respect to infiltration for these runs were as follows:

| Infiltration Cycle | Substrate Density g/cc | Deposition Temperature °F |
|---|---|---|
| 1 | 1.35 | 1860 |
| 2 | 1.50 | 1900 |
| 3 | 1.60 | 1875–1900 |

Mechanical property data for specimens with a density of 1.65 g/cc were as follows:

| Flexural Strength PSI | | Interlaminar Shear Strength PSI |
|---|---|---|
| E | F | |
| 18230 | 19370 | 6010 |

E = Edgewise Orientation
F = Flatwise Orientation

Thirty three layers of Kureha 8 H/S carbon cloth weighing 304 g were prepared, laid up at a 0°/90° orientation and fixtured as previously described to make a plate 7 inches × 5 1/4 inches × 1 inch thick. Substrate density prior to infiltration was 0.505 g/cc at a fiber volume of 31.5 v/o.

Substrate density changes with respect to infiltration were as follows:

| | |
|---|---|
| After initial bonding run | .92 g/cc |
| After first infiltration | 1.54 g/cc |
| After second infiltration | 1.65 g/cc |
| After third infiltration | 1.69 g/cc |

Mechanical property data for specimens with a density of 1.67 g/cc is as follows:

| Flexural Strength PSI | | Interlaminar Shear Strength PSI | Impact Strength FT-LBS/IN of Notch |
|---|---|---|---|
| E | F | | |
| 21150 | 17700 | 4700 | .62 |

E = Edgewise Orientation
F = Flatwise Orientation

EXAMPLE 4

Substrates Formed Using Open Weave Carbon Cloth and Alternate Layers of Disoriented Fibrous Material An open weave cloth manufactured by Hitco and identified as SS-1808 cloth was processed in this example as two different constructions — with alternating graphitized rayon felt layers and with alternating layers of chopped fibers. Unlike the Hitco G-1550 8 H/S graphite cloth which has a warp and fill count of 54 and 49 ends/inch respectively, Hitco SS-1808 carbon cloth has a warp and fill count of 14 and 11 ends/inch respectively.

Although the substrates used in this example having fiber volumes from 12.7 to 20.3 v/o were infiltrated to full density in considerably less time than is required for higher fiber folume content substrates of similar size, the mechanical properties achieved were relatively low.

Substrates made from Hitco SS-1808 open weave carbon cloth were constructed as follows:

Alternating layers of SS-1808 carbon cloth, 52.8 w/o cloth and 0.060 inch thick graphitized rayon felt layers were laid up to form a substrate which, when compressed using graphite fixtures, was 5.875 inches × 4.625 inches × 1.00 inch thick. Twenty four layers of cloth (50.4 g) and 24 layers of Fiber Materials Inc. rayon precursor graphitized felt weighing 45.0 g were used for this substrate. Density prior to infiltration was 0.214 g/cc with an approximate fiber volume of 12.8 v/o. Using the standard isothermal infiltration process, the substrate was infiltrated to a final density of 1.70 g/cc. Furnace processing conditions were the same as described previously. After pyrolytic carbon bonding all loose fibers were manually removed with a coarse file. Between later infiltration runs the plate was machined removing approximately 0.065 inch from each edge surface and 0.032 inch per side from the large faces.

Mechanical property data for this substrate were as follows:

| Flexural Strength PSI | | Interlaminar Shear Strength PSI | Compressive Strength PSI | |
|---|---|---|---|---|
| E | F | | E | F |
| 10000 | 11200 | 4560 | 26800 | 20075 |

E = Edgewise Orientation
F = Flatwise Orientation

Alternating layers of Hitco SS-1808 carbon cloth, 53.9 w/o cloth and ¼ inch long chopped carbon fibers (Hitco grade CFA¼) were laid up to form a substrate when compressed 5.875 inches × 4.625 inches × 1.00 inch thick. Forty three layers of cloth weighing 90.3g and 77.3g of chopped rayon precursor carbon fibers were used for this substrate. Density prior to infiltration, as compressed, was g/cc with an approximate fiber volume of 20.3 v/o. This substrate plate was processed in the same manner as the substrate described in the immediately preceding paragraphs. After infiltration the sample had a density of 1.66 g/cc. Substrate density changes with respect to infiltration were as follows:

| | |
|---|---|
| After initial bonding run | .66 g/cc |
| After first infiltration | 1.39 g/cc |
| After second infiltration | 1.57 g/cc |
| After third infiltration | 1.66 g/cc |

Mechanical property data for this substrate was as follows:

| Flexural Strength PSI | | Interlaminar Shear Strength PSI | Compressive Strength PSI | |
|---|---|---|---|---|
| E | F | | E | F |
| 8470 | 8480 | 3100 | 22500 | 27570 |

E = Edgewise Orientation
F = Flatwise Orientation

Alternating layers of SS-1808 carbon cloth, 47 w/o cloth and Kureha chopped carbon fibers were laid up to form a substrate when compressed 5.875 × 4.625 × 1.00 thick. Twenty two layers of cloth weighing 46.2 g and 51.2 g of chopped pitch precursor carbon fibers were used for this substrate. Density prior to infiltration, as compressed, was 0.22 g/cc with an approximate fiber volume of 12.7 v/o. This substrate plate was processed in the same manner as the substrate described in the immediately preceding paragraph. After infiltration, the sample had a density of 1.79 g/cc. Substrate density changes with respect to infiltration were as follows:

| | |
|---|---|
| After initial bonding run | .54 g/cc |
| After first infiltration | 1.67 g/cc |
| After second infiltration | 1.76 g/cc |
| After third infiltration | 1.79 g/cc |

Mechanical property data for this substrate is as follows:

| Flexural Strength PSI | | Interlaminar Shear Strength PSI | Compressive Strength PSI | |
|---|---|---|---|---|
| E | F | | E | F |
| 8280 | 9800 | 3900 | 18750 | 16100 |

E = Edgewise Orientation
F = Flatwise Orientation

EXAMPLE 5

Fabrication of Shaped Structures Using Graphite Cloth

In this example substrates having irregular shapes were assembled and processed in order to demonstrate the capability of manufacturing products having complex shapes.

a. A male-female leading edge die was machined from HLM graphite to make a part with a skin thickness of 0.150 inch, with a 1 inch leading edge radius, 5 inches long and a 2.5 inches separation between skins at the open end.

Eight G-1550 graphite cloth layers 5¼ inches × 15 inches, previously surface treated, were layed up in a 0°/90° orientation. The cloth used had a weight of 0.165 g/in². The substrate was compressed to a 0.150 inch thickness into a leading edge shape against spacers achieving a starting density of 0.54 g/cc at a fiber volume of 36 v/o.

Next, the substrate was bonded in a manner previously described. Following bonding the die was disassembled and all excess pyrolytic carbon sticking to the part surface removed by sanding.

The part was further infiltrated using similar furnacing conditions as in the bonding run achieving a density of 1.57 g/cc.

b. A die was prepared in the manner described in paragraph (a). Part dimensions were 0.150 inch thick, 6 inches wide, 11 inches long with a "spoiler" wave shape configuration in the side view orientation. As seen in the side view, two 2 inches long sections 150 inches thick running parallel to each other, 1 inch apart are connected in the center, to make the wave shape, with a gently blended radius of 3.7 inches.

Eight layers of G-1550 cloth, with a cloth weight of 0.165 g/in$^2$, 7½ inches = 12¼ inches in size, previously surface treated, were laid up with 0°/90° pattern. The substrate was compressed to shape, achieving a 0.54 g/cc density at a fiber volume of 36 v/o.

The part was bonded and infiltrated using similar furnacing conditions as those previously described achieving a density of 1.57 g/cc.

EXAMPLE 6

High Modulus, High Strength Fibrous Substrates Constructed from Thin Ply Carbon or Graphite Tape a. Twenty layers of thin ply untreated tape manufactured by Whittaker Morgan Inc. and identified as Modmor Type II tow were laid up into a panel evenly spreading each layer to a 4.125 × 4.125 inches dimension. Each layer was turned 90° with respect to the previous layer. The 0°/90° layup substrate weighed 28.5 g. Fixture face plates had a randomly oriented ⅛ inch diameter hole pattern to enhance gas diffusion. The layup was compressed against spacers to obtain a substrate density of 0.82 g/cc at a 48.2 v/o fiber volume.

The Modmor II untreated tape was made up from 10,000 filament tow. Filament properties are ultimate tensile strength (10$^3$ psi) — 350, modulus of elasticity (10$^6$ psi – 40 and specific gravity — 1.7 g/cc.

The assembly was infiltrated using the standard isothermal infiltration process. Density achieved was 1.284 g/cc.

The panel was infiltrated further to a density of 1.75 g/cc. Outside surfaces were sanded lightly between infiltration runs.

Flexure strength for 0.05 × 0.187 × 1 inch long samples tested in the flatwise orientation was 60,000 psi.

b. Twelve layers of a thin ply tape manufactured by Hitco and identified as HG 1900 were laid up on a face plate in a unidirectional manner. HG 1900 is an 8 H/S weave tape with polyacrylonitrile (PAN) high modulus fibers in the warp direction. PAN fiber properties are modulus-35 × 10$^6$ psi, tensile strength 200 × 10$^3$ psi. The fiber density is reported as 1.78 g/cc. The twelve tape layers weighed 30.1 grams and tape surfaces were not conditions prior to layup. Panel size was 4.250 inches × 4.250 inches × 0.155 inch thick. The assembled substrate when compressed had a starting density of 0.67 g/cc at a fiber volume of 36.9 v/o. At a density of 1.66 g/cc, a flexural strength of 66,100 psi was measured in edgewise orientation.

c. Twelve layers of tape manufactured by Hitco and identified as HG 1900 were laid up woth 0°/90° orientation. The fill yarn on both surfaces of each tape layer was fuzzed by rubbing with a fine grade wool woll raising a low nap. Any steel wood residue was removed with a strong magnet.

The panel size was 4.250 inches × 4.250 inches × 0.155 inch thick and weighed 29.0 grams. The starting density after compressing was 0.63 g/cc at a fiber volume of 35.5 v/o. At a density of 1.69 g/cc, a flexural strength of 51,200 psi was measured in the edgewise orientation.

d. Sixteen layers of HG 1900 tape weighing 40.0 g were laid up in a unidirectional manner. Tape surfaces were not conditioned prior to layup. Panel size was 4.250 inches × 4.250 inches × 0.182 inch thick. The assembled substrate when compressed had a starting density of 0.742 g/cc at a fiber volume of 41.7 v/o. At a density of 1.68 g/cc, a flexural strength of 75700 psi was measured in the edgewise orientation.

The following table lists the panel densities before and after bonding for substrates built up as described in paragraphs (b), (c) and (d).

| Para-graph | Fiber Volume v/o | Density prior to Bonding g/cc | Density after Bonding run g/cc | Nominal Density After Infiltration |
|---|---|---|---|---|
| (b) | 38.2 | .68 | 1.27 | 1.68 |
| (c) | 36.5 | .65 | 1.32 | 1.72 |
| (d) | 50.6 | .90 | 1.07 | 1.70 |

EXAMPLE 7

Iris Edge Grain Carbon and Graphite Cloth Layup Substrates for Aircraft Brakes

Five friction discs for aircraft brake applications were produced as a part of this example. Four discs were prepared using G-1550 8 harness Satin graphite cloth and one disc using Fiber Materials, Inc. square weave carbon cloth as substrate material. For this application the cloth was assembled in an angled layup pattern using many iris leaf-shaped segments.

Desired part configuration was 14.38 OD × 7 inches ID × ≈0.750 inch thick finish machined. The blank size selected prior to infiltration was 15.38 inches OD × 6 inches ID × thickness based on the desired fiber volume (36 v/o), cloth weight and segment spacing.

Each cloth segment has a leading and a trailing edge of an involute of a circle shape using the 6 inches ID and 15.38 OD circle arcs as boundaries with the following cord dimensions: 1.860 inches at the 6 inches ID and 4.757 inches at the 15.38 inches OD. the leading edge and trailing edge are spaced apart at the median diameter of 10.69 inches by a circle arc ∓ 3.4 inches long, cord length is 3.308 inches.

The segment size and configuration was designed so that 10 segments, lying flat, edge to edge with all curves fitting, make up a full 360° disc.

To obtain a maximum practical edge grain fiber effect, the iris leaf cloth segments were stacked on top of each other 1/16 inch apart at the median diameter. To make up one full 360° angled layup enough segments are added to the "end" layup side, spaced as before, tugged under "starting" layup side, to make one complete 360° equally spaced angled layer. One full 360° layer made up of staggered angled iris leaf segments each spaced 1/16 inch apart at the median diameter has a certain weight, based on the type of graphite or carbon cloth used. Knowing the weight and the desired OD and ID of the disc, the amount of the compression of the part to a given thickness (which is based on a desired fiber volume) was calculated.

For a disc with a 15.38 inches OD and a 6 inches ID, the surface area per cloth layer is 157.51 inch$^2$. One layer is made up of 10 equal segments and, therefore, surface area/segment is 15.751 inch$^2$ (unit surface area). In assembling the segments in an angled configuration, 55 segments fit into this unit surface area when spaced 1/16 inch apart at the median diameter of 10.69 inches.

Weight of segments:

Roughened G-1550 graphite cloth segment at 0.165 g/inch$^2$ = 2.599 g.

Roughened FMI carbon cloth segment at 0.1947 g/inch$^2$ = 3,067 g.

Since each unit surface area is made up of 55 angled segments, 550 segments are used to make one full 360° layup. Five hundred and fifty segments of G-1550 graphite cloth weight = 1429.4 g. Five hundred and fifty segments of FMI carbon cloth weight = 1686.7 g.

The G-1550 graphite fiber density is 1.5 g/cc. Therefore, a fiber volume of 36 v/o in the composite requires a starting density of 0.54 g/cc prior to infiltration.

The average carbon fiber density is 1.6 g/cc; therefore, a fiber volume of 36 v/o in the composite requires a starting density of 0.58 g/cc prior to infiltration.

Assuming the part is to be made at a fiber volume percent of 36 v/o, the required compressed part thickness for each cloth type is as follows:

G-1550 Graphite Cloth (36 v/o)
Compress G-1550 part to: 1.026 inch
Angle of inclination (edge grain): ≈16½°
FMI Carbon Cloth (36 v/o)
Compress carbon cloth part to: 1.135 inch
Angle of inclination (edge grain): ≈18°

After preliminary calculations were completed, the rayon precursor carbon and graphite cloth was cut into easy to handle sections approximately 3 feet long by the cloth width (35 inches for G-1550 and 44 inches for FMI carbon cloth). Next, both cloth surfaces were abraded manually by rubbing steel wool against the warp and fill yarn raising an even nap. Any steel wool residue was removed with a strong magnet.

The iris leaf-shaped cloth segments were cut with a steel rule die. Fuzzed cloth layers were stacked ≈1.16 inch apart on face plates of an adjustable graphite compression die. The adjustable graphite compression dies constitute two grooved backup plates with a ¾ inch diameter hole pattern, two face plates with a ¼ inch diameter hole pattern, six bolts (three at ID and three opposing at OD) and 1 inch diameter spacers.

The cloth segments were restrained from moving out of place during compression by ¼ inch diameter pins located at close intervals around the OD and ID of the part. Using stainless (308) and graphite bolts and nuts, the parts were next compressed onto spacers to achieve the 36 v/o fiber volume for both cloth types.

Disc No. 1 made from FMI square weave carbon cloth weighed assembled 1660 g and was compressed to 1.117 inch thickness.

Disc No. 2 thru No. 5 had the following weight - thickness relationship:

| No. | Weight | Thickness, in. |
|---|---|---|
| 2 | 1350.8 g | .969 |
| 3 | 1320.3 g | .947 |
| 4 | 1357.2 g | .974 |
| 5 | 1353.2 g | .971 |

Upon removal of the fixtures, after the bonding step, the densities for each disc were as follows:

| Disc No. | g/cc |
|---|---|
| 1 | 1.06 |
| 2 | .96 |
| 3 | 1.16 |
| 4 | 1.26 |
| 5 | 1.24 |

Disc No. 1 reached a density of 1.30 g/cc, whereas discs No. 2 thru No. 5 at identical furnacing conditions had a density of 1.58 g/cc, 1.51/cc, 1.51 g/cc and 1.52 g/cc respectively. Final densities for machined discs 2, 3, 4 and 5 were 1.67 g/cc, 1.63 g/cc, 1.64 g/cc and 1.63 g/cc respectively.

EXAMPLE 8

Compressed Carbon and Graphite Cloth Wrapped Cylinders

A compression fixture of the type illustrated in FIG. 12 was used in this example to form a substrate cylinder with a 2.6 inches OD, 1.8 inches ID and 7.5 inches length.

A GSCC-8, 8 Harness Satin weave carbon cloth was used in forming the substrate. Ater the cloth was surface treated in a manner as previously described, it was cut into 3 strips 8½ inches wide × 84 inches long. Next, each cloth section was attached to the ID mandrel and tightly wrapped onto the ID mandrel using a lathe.

The desired fiber volume was achieved by forcing the circumferentially wraped carbon cloth of predetermined weight into the fixed die cavity volume through axial and circumferential compression. The substrate had a starting density of 0.74 g/cc with a fiber volume of 49.3 v/o.

After the initial bonding run, the cylinder was sectioned into three 2¼ inches long pieces and processed further in this state. After further infiltration the average density for the three sections was 1.65 g/cc. (See table below). High density CVD carbon coatings on the surface of the substrate were removed by machining prior to subsequent infiltration.

Cylinders A and B were graphitized at 2980° C for 2 hours. An average of 0.005 inch on the OD and 0.012 inch on the ID was measured for out of roundness for the graphitized tube sections. Tubes "A" and "C" were machined to a dimension of 2.37 inches OD × 2.13 inches ID × 2.00 inches length.

| DENSITY VERSUS INFILTRATION TIME FOR A TUBE SECTIONS A, B AND C | | | | |
|---|---|---|---|---|
| Infiltration Cycles | Full Length Tube Density g/cc | Tube Section Density | | |
| | | "A" g/cc | "B" g/cc | "C" g/cc |
| First | 1.21 | 1.21 | 1.16 | 1.23 |
| Second | | 1.60 | 1.59 | 1.59 |
| Third | | 1.60 | 1.61 | 1.60 |
| Fourth | | 1.65 | 1.63 | 1.68 |
| Following Graphitization | | 1.64 | 1.66 | |
| Tube Starting Density | .74 | | | |

EXAMPLE 9

Nested Cone Shaped Graphite Cloth Layup (45° Half Angle Orientation)

A fixture similar to that shown in FIG. 14 having a die cone half angle of 45° was used in this example.

Previously surface treated G-1550 graphite cloth which was die cut into 118 layers weighing 508.8 g was used in building up the substrate. The outside and inside diameter of the cloth discs were 5 inches and 5/16 inch respectively. Each cloth layer was then slit from the OD to the center hole, overlapped to form a 90° included angle and placed around the center stainless steel bolt into the female die section. The slitted overlapped joint for each cloth layer was staggered in an evenly spaced layup for each successive cloth layer around the bolt. Next, the male portion of the die was forced against the layup by tightening the bolt, compressing the layup into a cylinder having a substrate density of 0.51 g/cc at a fiber volume of 33.9 v/o. The layup assumes the shape of the mating surfaces.

Excess material was trimmed and the substrate was bonded by pyrolytic carbon infiltration. The density of the bonded substrate was 1.02 g/cc. The bonded substrate cylinder with 45° half angle cone shaped ends was further infiltrated achieving a density of 1.531 g/cc. High density pyrolytic carbon coatings on the surface of the substrate were removed by machining prior to each infiltration run.

Small test dynamometer discs machined from this sample with the cloth layers oriented at 45° to the friction surface, further infiltrated to a density of 1.63 g/cc, exhibited excellent friction and wear properties and showed very low oxidation following the complete testing sequence.

EXAMPLE 10

Substrates Formed From Non-Woven Precursor Carbon Fibers Such As Pan, Pitch or Rayon Four layers of needled Modmor 11 felt weighing a total of 11.8 g were cut to 4.010 inches × 3.40 inches and compressed to 0.302 inch thickness using a fixture similar to those described in earlier examples. Density of the as-compressed felt was approximately 0.2 g/cc at a fiber volume of ≈ 10%.

The substrate layers were bonded using standard infiltration conditions, density achieved after bonding was 1.13 g/cc. Further infiltration resulted in a composite with a final density of 1.84 g/cc.

Flexural strength was 18,400 psi (21,600 psi max.) edgewise orientation and 15,300 psi flatwise orientation; interlaminar shear strength was 5100 psi.

Kureha carbon "wool" made from 4 inches long pitch precursor staple fibers was compacted into a hollow cylindrical mandrel resulting in substrate diamensions of 4⅛ inches OD × 1 inch ID × 2¼ inches high. the mandrel used was similar to the one described in Example 8, however, no pins (88) were required and the outside restraining sections (72) were made as one piece (FIG. 12). Density of the substrate prior to infiltration was ≈ 0.3g/cc at a fiber volume of 18.8 v/o. Following bonding the substrate was removed from the fixture and further infiltrated to reach a final density of 1.76 g/cc.

Substrate density changes with respect to infiltration were as follows:

| | | |
|---|---|---|
| After initial bonding run | .479 | g/cc |
| After first infiltration | 1.657 | g/cc |
| After second infiltration | 1.73 | g/cc |
| After third infiltration | 1.76 | g/cc |

Mechanical property data for this substrate is as follows:

| Flexural Strength PSI | | Compressive Strength PSI | |
|---|---|---|---|
| E | F | E | F |
| 12,500 | 11,600 | 19,900 | 18,750 |

E = Edgewise Orientation
F = Flatwise Orientation

I claim:

1. A method of forming a high strength fiber reinforced composite product comprising the steps of:
   a. constructing a basic substrate from a compressible carbon fibrous material selected from the group consisting of pyrolyzed wool, rayon, polyacrylonitrile and pitch fibers, the fiber volume of said fibrous material being known and the volume of said basic substrate being greater than the volume of the final product;
   b. compressing said basic substrate by a pressure compaction means for reducing the volume of said basic substrate into a shaped substrate so that said shaped substrate will have a shape substantially corresponding to the shape of the final product; will have a fiber volume of between 8% and 69%; and will have sufficient internal porosity to permit the passage of gas therethrough; and
   c. forming said shaped substrate into a bonded substrate by constraining said shaped substrate within said pressure compaction means to substantially maintain its shape and fiber volume while interstitially depositing pyrolytic material to structurally bond together the compressible fibrous carbon material with pyrolytic material, said pyrolytic material being selected from a group consisting of pyrolytic carbon, pyrolytic graphite, boron nitride, tantalum, tungsten, molybdenum, columbium, tantalum carbide, niobium carbide, zirconium carbide, hafnium carbide and silicon carbide.

2. A method of forming a product as defined in claim 1 in which said compressible carbon fibrous material is in the form of a woven material having a multiplicity of interwoven carbon fibers.

3. A method of forming a product as defined in claim 2 including removing the outer surface from said bonded substrate and thereafter densifying said bonded substrate by further deposition of pyrolytic material selected from a group consisting of pyrolytic carbon, pyrolytic graphite, boron nitride, tantalum, tungsten, molybdenum, columbium, tantalum carbide, niobium carbide, zirconium carbide, hafnium carbide and silicon carbide.

4. A method of forming a product as defined in claim 2 in which said compressible carbon fibrous material is in the form of a plurality of layers of a fabric material having a multiplicity of interwoven carbon fibers.

5. A method of forming a product as defined in claim 4 in which said basic substrate is formed into a shaped substrate having a fiber volume of between 31% and 36%.

6. A method of forming a product as defined in claim 4 in which said layers of fabric material are oriented with respect to one another to obtain the desired final product internal fiber configuration.

7. A method of forming a product as defined in claim 4 in which said layers of fabric material are lying in planes forming an angle relative to the longitudinal axis of said basic substrate.

8. A method of forming a product as defined in claim 4 in which said layers of fabric material are wound circumferentially about the longitudinal axis of said basic substrate.

9. A method of forming a product as defined in claim 4 in which said layers of fabric material are generally conically-shaped and are nested together in a coaxial relationship.

10. A method of forming a product as defined in claim 1 in which said compressible carbon fibrous material is in the form of a multiplicity of non-woven carbon fibers.

11. A method of forming a product as defined in claim 10 in which said basic substrate is formed into a shaped substrate having a fiber volume of between approximately 8% and approximately 20%.

12. A method of forming a product as defined in claim 10 in which said compressible carbon fibrous material is in the form of a felt having a multiplicity of randomly arranged carbon fibrs.

13. A method of forming a product as defined in claim 10 in which said compressible carbon fibrous material comprises high modulus carbon fibers.

14. A method of forming a high strength fiber reinforced composite product comprising the steps of:

a. stacking a plurality of compressible carbon fibrous members formed from material selected from the group consisting of pyrolyzed wool, rayon, polyacrylonitrile and pitch fibers into a basic substrate, the volume of solid material in each of said compressible members being known and the volume of the basic substrate thus formed being greater than is desired in the final product, said compressible members being oriented with respect to one another to obtain the desired substrate internal fiber orientation;

b. compressing said basic substrate to reduce the volume thereof so that the compressed substrate will have a shape substantially corresponding to the desired shape of the final product, will have a fiber volume of between approximately 8% and 36% and will have the desired internal fiber orientation;

c. bonding together the fibrous material of said compressed substrate to form a one-piece bonded substrate by interstitially depositing pyrolytic material while said compressed substrate is being held in a compressed condition, said pyrolytic material being selected from a group consisting of pyrolytic carbon, pyrolytic graphite, boron nitride, tantalum, tungsten, molybdenum, columbium, tantalum carbide, niobium carbide, zirconium carbide, hafnium carbide and silicon carbide;

d. removing the outer surface from said bonded substrate and thereafter densifying said bonded substrate by further deposition of pyrolytic material selected from a group consisting of pyrolytic carbon, pyrolytic graphite, boron nitride, tantalum, tungsten, molybdenum, columbium, tantalum carbide, niobium carbide, zirconium carbide, hafnium carbide and silicon carbide; and e. sizing said densified bonded substrate to its final size and shape.

15. A method of forming a product as defined in claim 14 in which said carbon fibrous members have been heated to graphitization temperatures.

* * * * *